April 28, 1953  C. E. LECKINGTON  2,636,524
SUPPORT ARM FOR POWER SAWS
Filed Jan. 17, 1951  2 SHEETS—SHEET 1
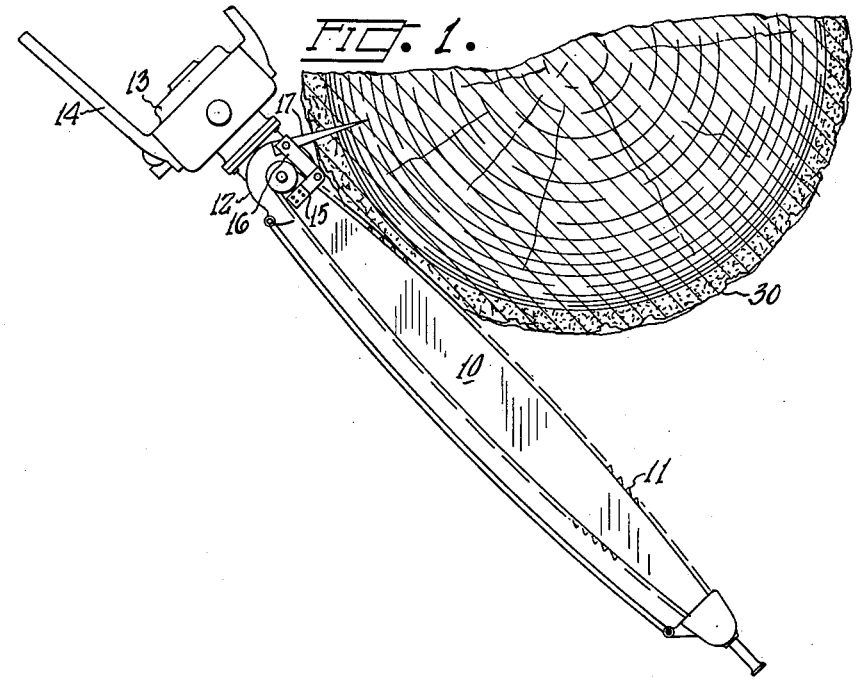
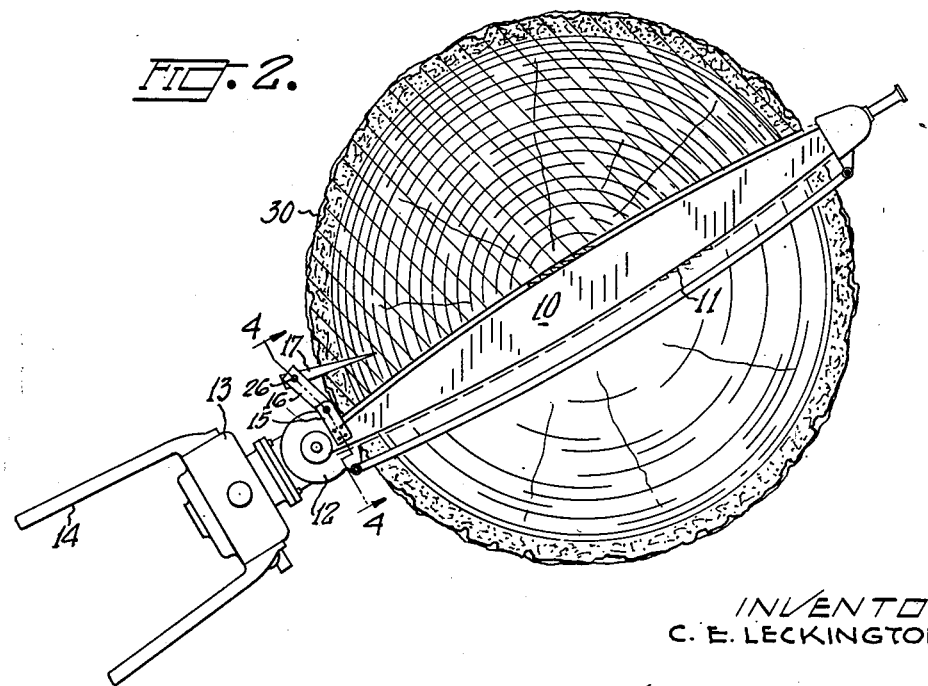
INVENTOR
C. E. LECKINGTON
ATTORNEY April 28, 1953     C. E. LECKINGTON     2,636,524
SUPPORT ARM FOR POWER SAWS
Filed Jan. 17, 1951     2 SHEETS—SHEET 2
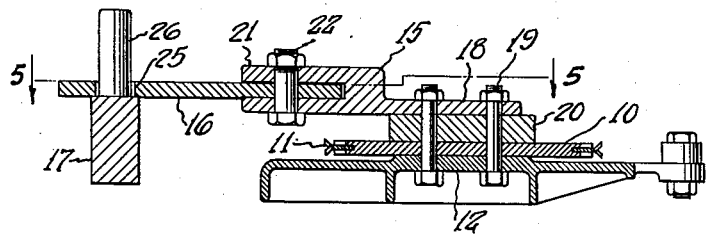
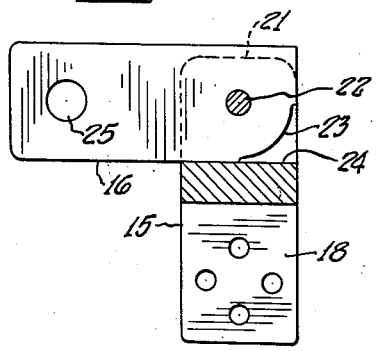
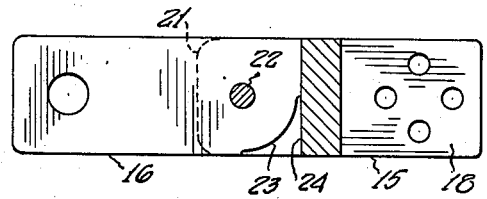
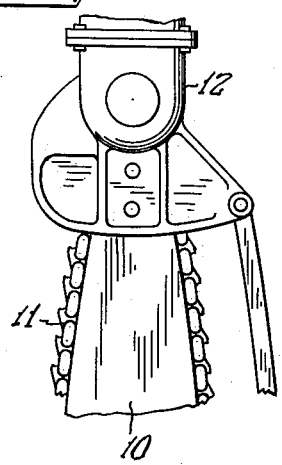
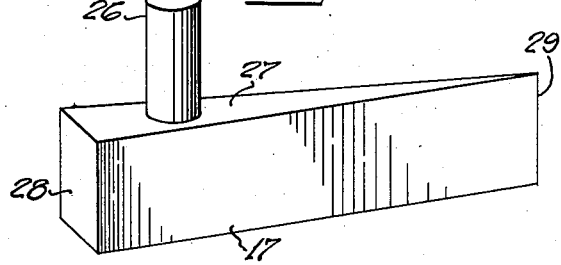
INVENTOR
C. E. LECKINGTON
ATTORNEY

UNITED STATES PATENT OFFICE 2,636,524

SUPPORT ARM FOR POWER SAWS

Charles E. Leckington, Tillamook, Oreg.

Application January 17, 1951, Serial No. 206,436

1 Claim. (Cl. 143—32)

This invention relates generally to power saws and particularly to a support arm therefor.

The main object of this invention is to provide a means for assisting in the handling of a power saw by two men and the making of a cut in a tree whose diameter approximates the working range of the saw.

The second object is to decrease the hazard of operating a two man saw by reducing the amount of physical effort required to operate the saw, particularly for falling trees.

The third object is to so construct the support in a manner that will require no alteration of the saw and which will be light in weight, easy to construct and not easily rendered inoperative.

I accomplish these and other objects in the manner set forth in the following specifications as illustrated in the accompanying drawings, in which Fig. 1 is a horizontal section through a tree showing the saw and support arm in a plan view at the start of a cut.

Fig. 2 is a view similar to Fig. 1 but showing the relation of the saw and support to the tree at the end of the cut.

Fig. 3 is a fragmentary plan of the power end of the saw.

Fig. 4 is a section taken along the line 4—4 in Fig. 2.

Fig. 5 is a section of the support taken along the line 5—5 in Fig. 4, corresponding with the cut starting position shown in Fig. 1.

Fig. 6 is a view similar to Fig. 5 but showing the cut finishing position as in Fig. 2.

Fig. 7 is a perspective view of the anchoring wedge.

Like numbers of reference refer to the same or similar parts throughout the several views.

Referring in detail to the drawings there is shown a common form of power saw including a saw bar 10, the saw chain 11 and transmission confined within a housing 12 and driven by a power unit 13 provided with handles 14.

Referring particularly to my invention, it will be seen to consist of three essential parts, a forked bracket 15, a support arm 16 and an anchoring wedge 17.

The bracket 15 has its end 18 attached to the bar 10 by means of the same bolts 19 which attach the bar 10 and spacer plate 20 to the transmission housing 12. The forked end 21 of the bracket 15 is provided with a bolt 22 on which is pivoted the arm 16, having a rounded corner 23 which enables the arm 16 to swing through 90°, at each extreme position stopping against the bottom 24 of the bracket 15.

In the opposite end of the arm 16 is formed a hole 25 through which projects a pivot pin 26 which projects from a side 27 of the anchoring wedge 17 whose head 28 is intended to be struck by a sledge when driving it into a tree. The edge 29 of the wedge 17 is sharp enough to permit the easy driving of the wedge into a tree 30.

In the operation of the device, the wedge 17 is removed from the arm 16 and driven into the tree 30 in the plane of the cut to be made. The saw bar 10 is then put into position at the line of the cut and the pin 26 is entered into the arm hole. The saw is then operated using the pin 26 as a fulcrum and enabling the sawyer to swing the saw into the tree as shown in Fig. 2, after which the position of the saw is reversed and the cut is completed.

I claim:

A support for power saws comprising an elongated bracket having holes through one end through which it may be bolted to a power saw frame, the opposite end of said bracket having a slot formed therethrough parallel with the plane of the saw frame, said slot having its bottom normal to the length of the bracket, the slotted portion of said bracket having an intersecting bolt hole, an arm occupying said slot having a bolt hole at one end and having one corner curved on a radius struck from the center of said bolt hole, the adjacent portions of said arm stopping against the bottom of said slot, a bolt extending through said slotted portion and arm, an anchoring wedge having a tapering body and having one pointed end and one opposite striking end and having two parallel sides, a pivot pin mounted in said wedge near its striking end normal to its parallel sides, said arm having a hole in the end thereof remote from said rounded end adapted to removably receive said pivot pin.

CHARLES E. LECKINGTON.

References Cited in the file of this patent

UNITED STATES PATENTS

| Number | Name | Date |
|---|---|---|
| 739,496 | Kidder | Sept. 22, 1903 |
| 1,046,800 | Kawasaki | Dec. 10, 1912 |
| 1,239,384 | Gisch | Sept. 4, 1917 |
| 2,463,860 | Foster | Mar. 8, 1949 |